United States Patent
Lee et al.

(10) Patent No.: US 9,447,952 B2
(45) Date of Patent: Sep. 20, 2016

(54) ELECTRONIC DEVICE WITH LIGHTING APPARATUS

(71) Applicant: ShenZhen Treasure City Technology Co., LTD., Shenzhen (CN)

(72) Inventors: Ming-Chang Lee, New Taipei (TW); Qi-Lin Bo, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 528 days.

(21) Appl. No.: 13/710,485

(22) Filed: Dec. 11, 2012

(65) Prior Publication Data

US 2014/0071686 A1   Mar. 13, 2014

(51) Int. Cl.
*F21V 21/14* (2006.01)
*F21V 8/00* (2006.01)

(52) U.S. Cl.
CPC .............. *F21V 21/14* (2013.01); *G02B 6/0001* (2013.01); *G02B 6/0091* (2013.01); *G02B 6/0095* (2013.01)

(58) Field of Classification Search
CPC ....... F21S 8/033; F21S 8/086; F21V 21/116; F21V 21/02; F21V 21/14; F21V 33/0052; F21V 33/00; F21V 23/06; F21V 9/16; F21V 15/015; F21V 17/18; F21V 21/088; F21V 21/32; F21V 29/004; F21V 29/20; F21V 7/005; B60Q 1/2615; G02B 6/0095; G02B 6/0091; G02B 6/0001; G02B 6/0045; G02B 6/0073; F21K 9/00; G02F 1/133603; G02F 1/133617; G02F 1/133621; A47B 21/045; A63H 23/08; A63H 3/003; G09F 23/02; G09F 23/04; G09F 23/06; H04N 1/00236; H04N 1/00525; H04N 1/00554; H04N 1/00564; H04N 1/02815; H04N 1/02845; H04N 1/0288; H04N 1/1215; H04N 2201/0096; H04N 5/2254; H04N 5/2256; H04N 5/2257; H04N 5/23229
See application file for complete search history.

(56) References Cited

U.S. PATENT DOCUMENTS

| | | | |
|---|---|---|---|
| 5,561,668 A | 10/1996 | Genter | |
| 6,561,668 B2 * | 5/2003 | Katayama | F21V 33/0052 362/109 |
| 7,686,466 B2 * | 3/2010 | Lev | F21V 33/0052 362/165 |
| 7,969,505 B2 * | 6/2011 | Saito | G06F 1/1616 348/370 |
| 2005/0274855 A1 * | 12/2005 | Shin | 248/220.22 |
| 2009/0166493 A1 | 7/2009 | Lee | |
| 2010/0008096 A1 | 1/2010 | Ling et al. | |

FOREIGN PATENT DOCUMENTS

| | | |
|---|---|---|
| JP | 52-15032 U | 2/1977 |
| JP | 60-172227 U | 11/1985 |
| JP | 2011-130197 A | 6/2011 |

* cited by examiner

*Primary Examiner* — Stephen F Husar
*Assistant Examiner* — Danielle Allen
(74) *Attorney, Agent, or Firm* — Zhigang Ma (57) ABSTRACT

An electronic device includes a base, and a lighting apparatus mounted to the base. The lighting apparatus includes a bracket mounted to the base, a pivoting member pivotably attached to the bracket, and a lighting unit fixed in the pivoting member. The pivoting member is pivoted out of the bracket to expose and turn on the lighting unit. The pivoting member is pivoted into the bracket to cover and turn off the lighting unit.

16 Claims, 7 Drawing Sheets

ELECTRONIC DEVICE WITH LIGHTING APPARATUS

BACKGROUND

1. Technical Field

The present disclosure relates to electronic devices, and more particularly to an electronic device with a lighting apparatus.

2. Description of Related Art

Electronic devices, such as portable computers, usually include data input units such as a keyboard. Typically, such data input units are not readily visible when used in the dark.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean "at least one."

Figure 1:
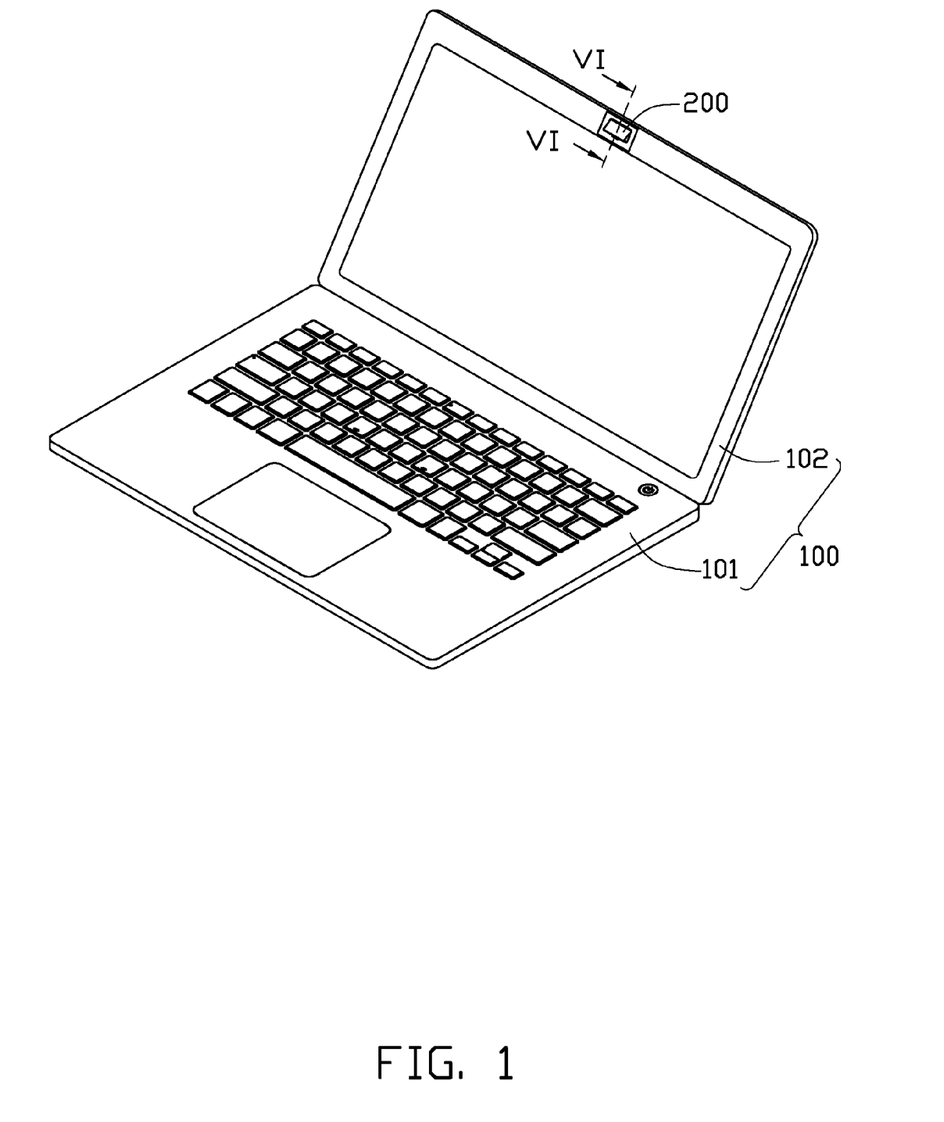
FIG. 1 is an isometric view of an embodiment of an electronic device, the electronic device including a lighting apparatus.

FIG. 1 shows an embodiment of an electronic device. The electronic device includes a base 100 and a lighting apparatus 200 mounted to the base 100. In this embodiment, the base 100 is a notebook computer. The notebook computer includes a computer base 101 and a liquid crystal display (LCD) monitor 102 pivotably attached to the computer base 101. The lighting apparatus 200 is fixed to one side of the LCD monitor 102 away from a pivot between the computer base 101 and the LCD monitor 102. In other embodiments, the lighting apparatus 200 may be fixed to any part of the base 100, which can light the computer base 101.

Figure 2:
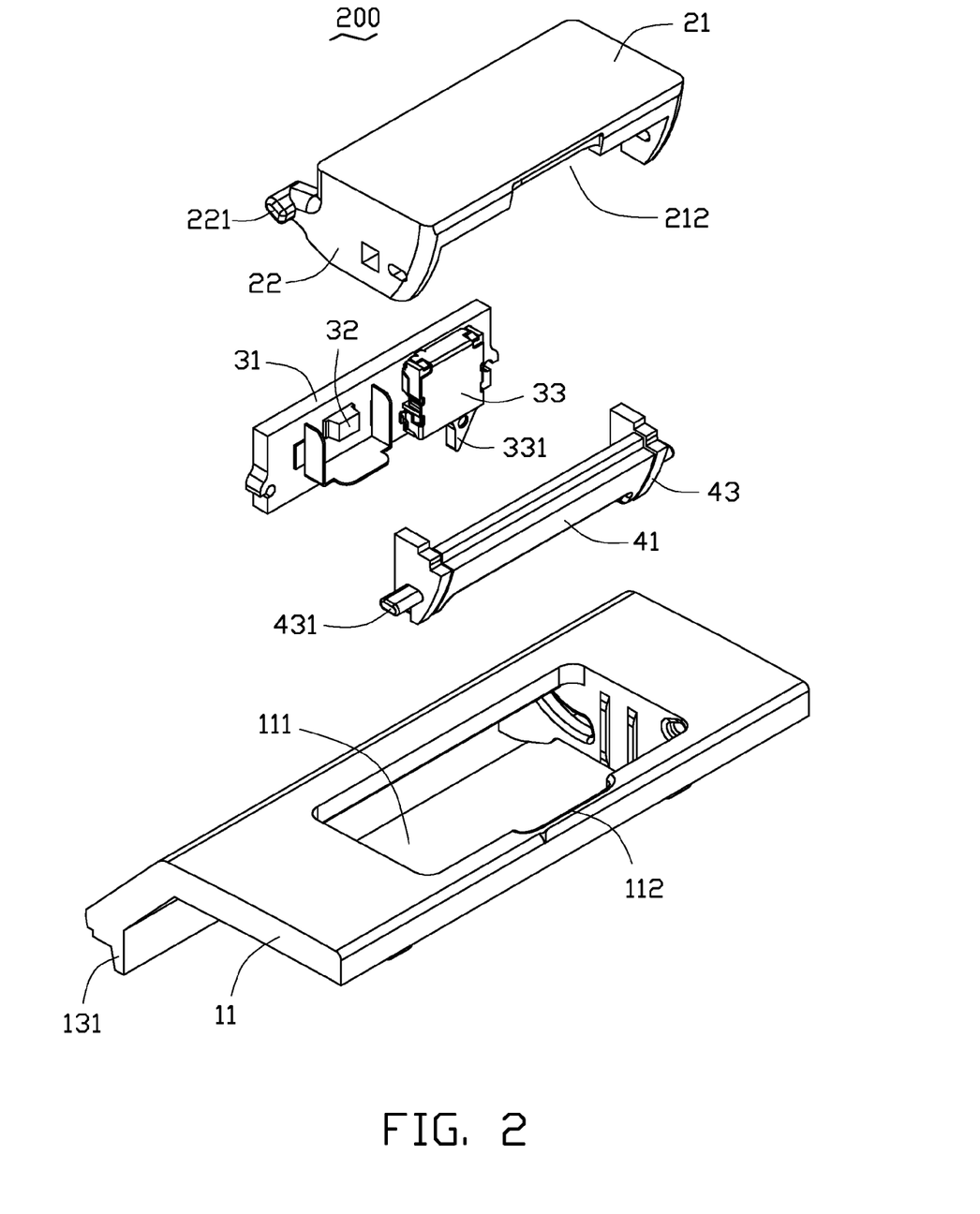
FIGS. 2 and 3 are exploded, isometric views of the lighting apparatus of FIG. 1, from different aspects.
Figure 3:
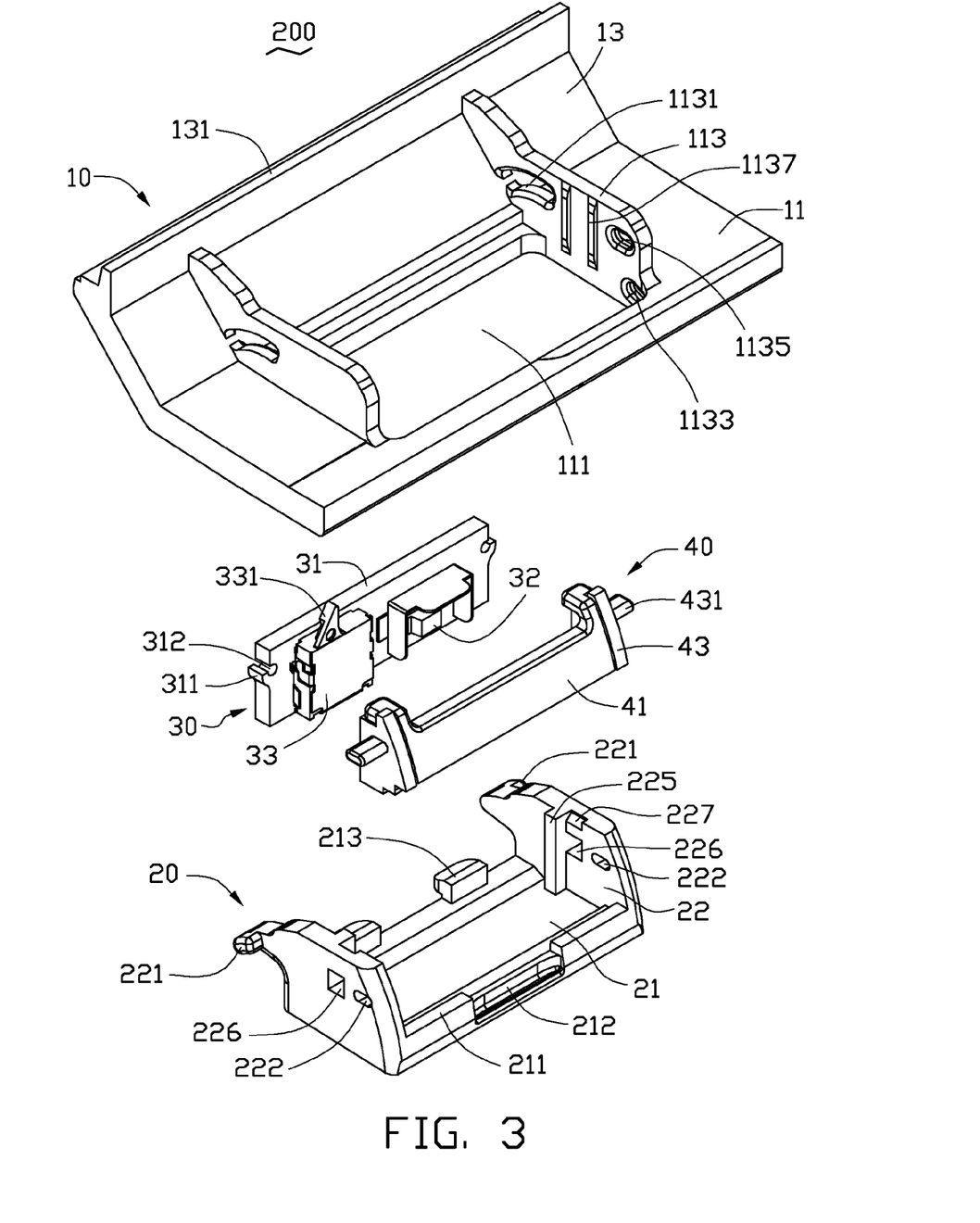

FIG. 2 and FIG. 3 show the lighting apparatus 200 of the embodiment. The lighting apparatus 200 includes a bracket 10, a pivoting member 20, a lighting unit 30, and a light guiding unit 40.

The bracket 10 includes a main wall 11 and a sidewall 13 extending slantingly from one side of the main wall 11. The main wall 11 defines an opening 111 in a center and includes two mounting plates 113 perpendicularly extending from the main wall 11 and respectively located at opposite sides of the opening 111. A recess 112 is defined in an outer surface of the main wall 11 and communicates with the opening 111. Two arc-shaped slide slots 1131 are respectively defined in first sides of the mounting plates 113 adjacent to the sidewall 13. A first notch 1133 and a second notch 1135 are defined in an inner surface of a second side of each mounting plate 113 facing the other mounting plate 113. Two ribs 1137 extend on the inner surface of each mounting plate 113. A stepped flange 131 is formed at an edge of the sidewall 13 away from the main wall 11. The mounting plates 113 extend to be perpendicularly connected to the flange 131.

The pivoting member 20 includes a base board 21 and two side boards 22 perpendicularly extending from opposites ends of the base board 21. A flange 211 is formed from a first side of the base board 21. A cutout 212 is defined in a middle of the flange 211. Two blocks 213 extend outward from an inner surface of a second side of the base board 21. A sliding block 221 extends on an outer surface of each side board 22 adjacent to the second side of the base board 21. A compressed through hole 222 is defined in each side board 22 adjacent to the first side of the base board 21. A long blocking plate 225 extends from a middle of an inner surface of each side board 22 and is perpendicular to the base board 21. A locking slot 226 is defined in each side board 22 adjacent to the blocking plate 225. A guiding slope 227 is formed on each side board 22 at a side of the locking slot 226 opposite to the base board 21.

The lighting unit 30 includes a circuit board 31, and a lighting element 32 and a controlling element 33 both arranged on a same side of the circuit board 31. Two arc-shaped raised portions 311 extend up and out from opposite ends of the circuit board 31. A round cutout 312 is defined in each end of the circuit board 31, with an opening of the cutout 312 facing a concave surface of the corresponding raised portion 311. In one embodiment, the lighting element 32 is a light-emitting diode (LED). The controlling element 33 is used to turn on or turn off the lighting element 32. The controlling element 33 includes a switch 331. The switch 331 is pressed to turn off the lighting element 32. The switch 331 is restored out to turn on the lighting element 32.

The light guiding unit 40 includes a transparent guiding body 41 and two clipping members 43 attached to opposite ends of the transparent guiding body 41. A compressed tab 431 extends from an outer surface of each clipping member 43 opposite to the transparent guiding body 41. The transparent guiding body 41 and the clipping members 43 are made of flexible material, such as flexible plastic.

Figure 4:
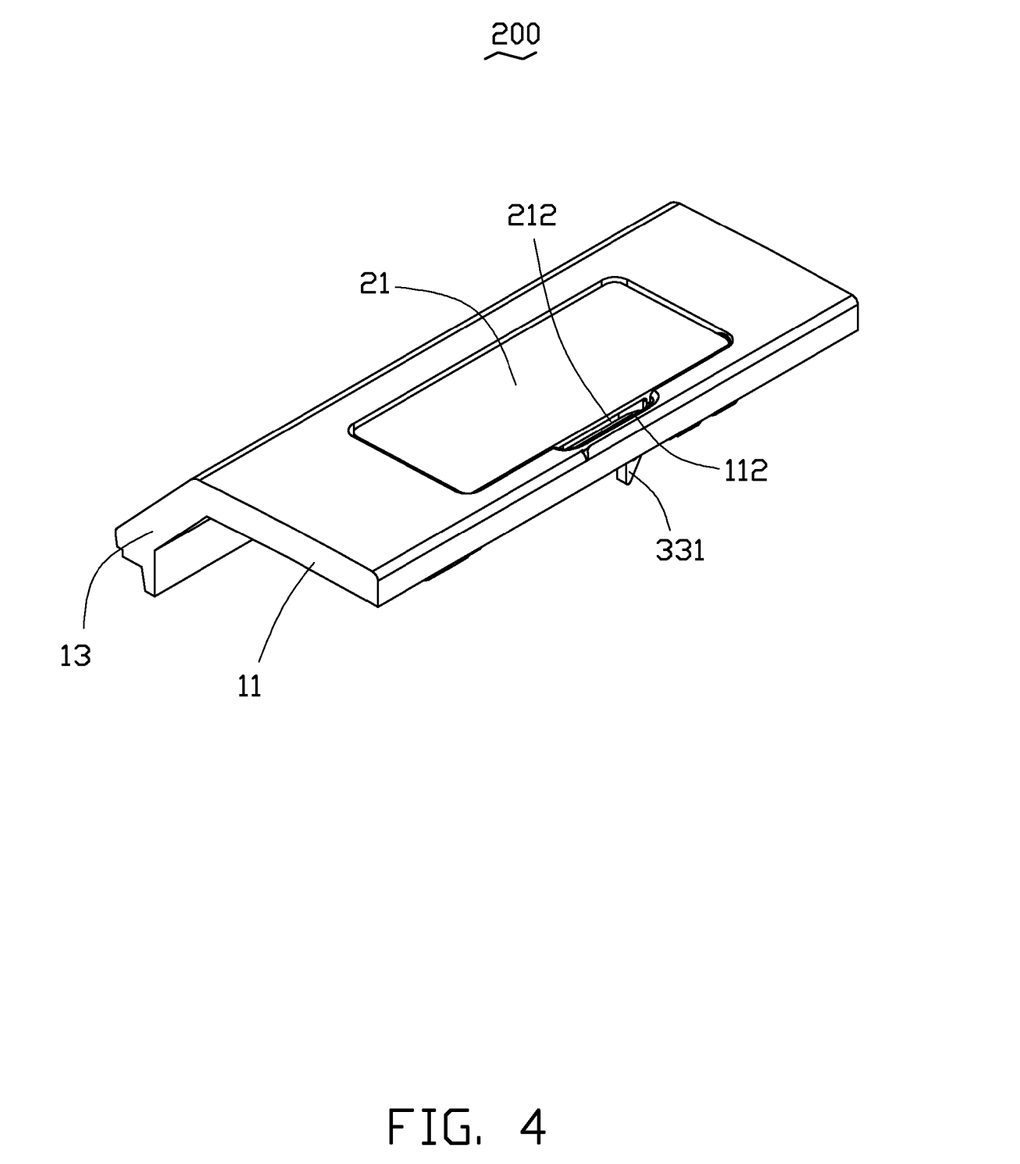
FIG. 4 is an assembled view of FIG. 2.
Figure 5:
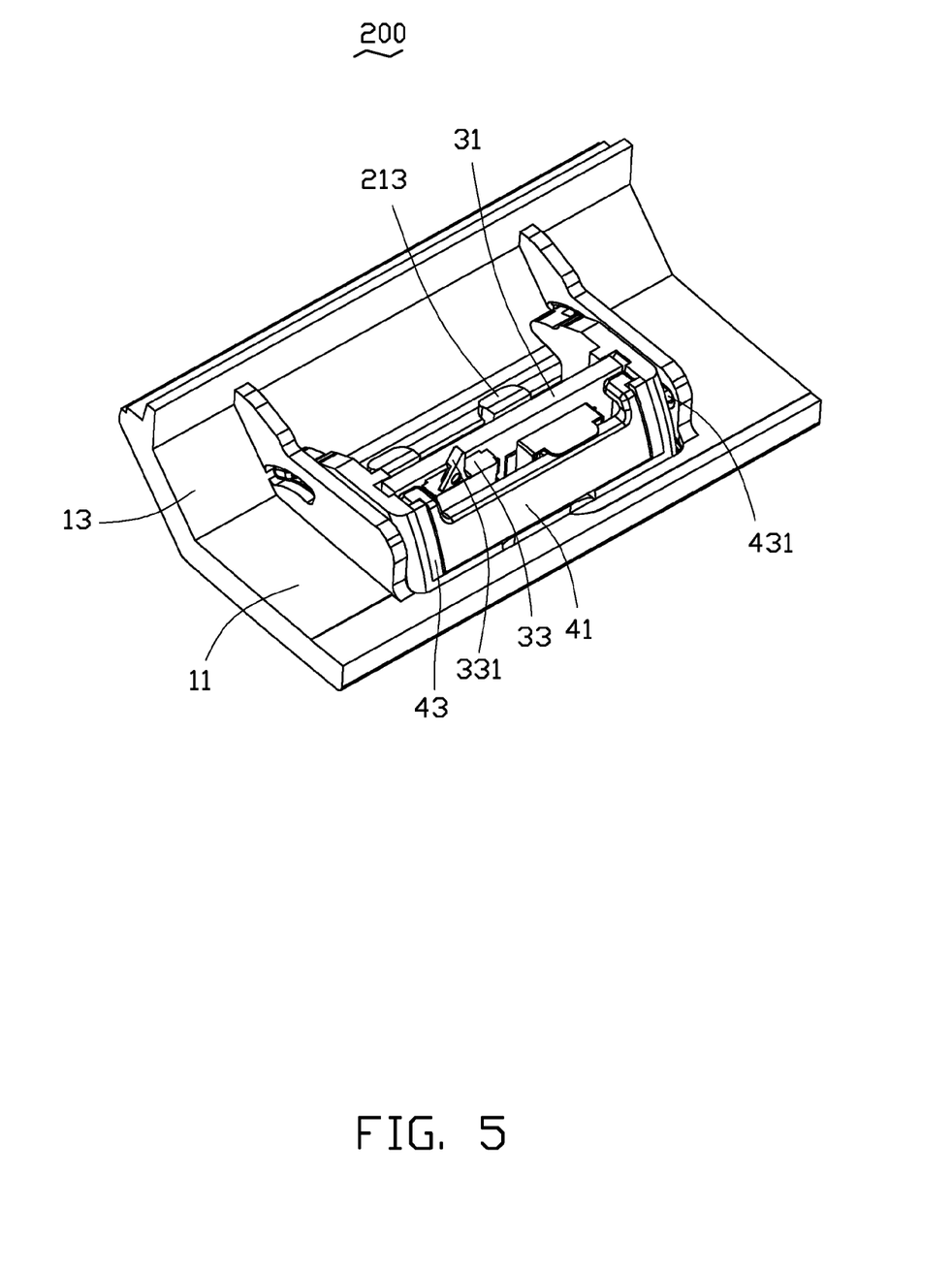
FIG. 5 is an assembled view of FIG. 3.

FIG. 4 and FIG. 5 show that in assembling of the lighting apparatus 200, the light guiding unit 40 is deformed to make the tabs 431 engage in the through holes 222 and extend out of the corresponding side boards 22. A bottom of the light guiding unit 40 blocks an inner surface of the flange 211. The lighting unit 30 is pressed down along the blocking plate 225, until the raised portions 311 are deformed to ride over the corresponding guiding slopes 227 and are restored to engage into the corresponding locking slots 226. Thus, the lighting unit 30 is fixed to the pivoting member 20 and located among the blocking plates 225 and the light guiding unit 40. The lighting element 32 abuts against the guiding body 41. The side boards 22 are deformed toward each other to align the sliding blocks 221 with the slide slots 1131 respectively. The side boards 22 are then released to make the sliding blocks 221 respectively slidably engage in the slide slots 113. Thus, the pivoting member 20 is pivotably and slidably attached to the bracket 10 along the slide slots 1131. The base board 21 is exposed through the opening 111. The tabs 431 extend through the through holes 222 to respectively engage in the second notches 1135. The blocks 213 are blocked by a portion of the inner surface of the main wall 11 adjacent to the opening 111. The recess 112 and the cutout 212 communicate with each other to together form a space for user's fingers to operate the lighting apparatus 200. The ribs 1137 are used for the pivoting member 20 to easily pivot relative to the sidewalls 13.

Figure 6:
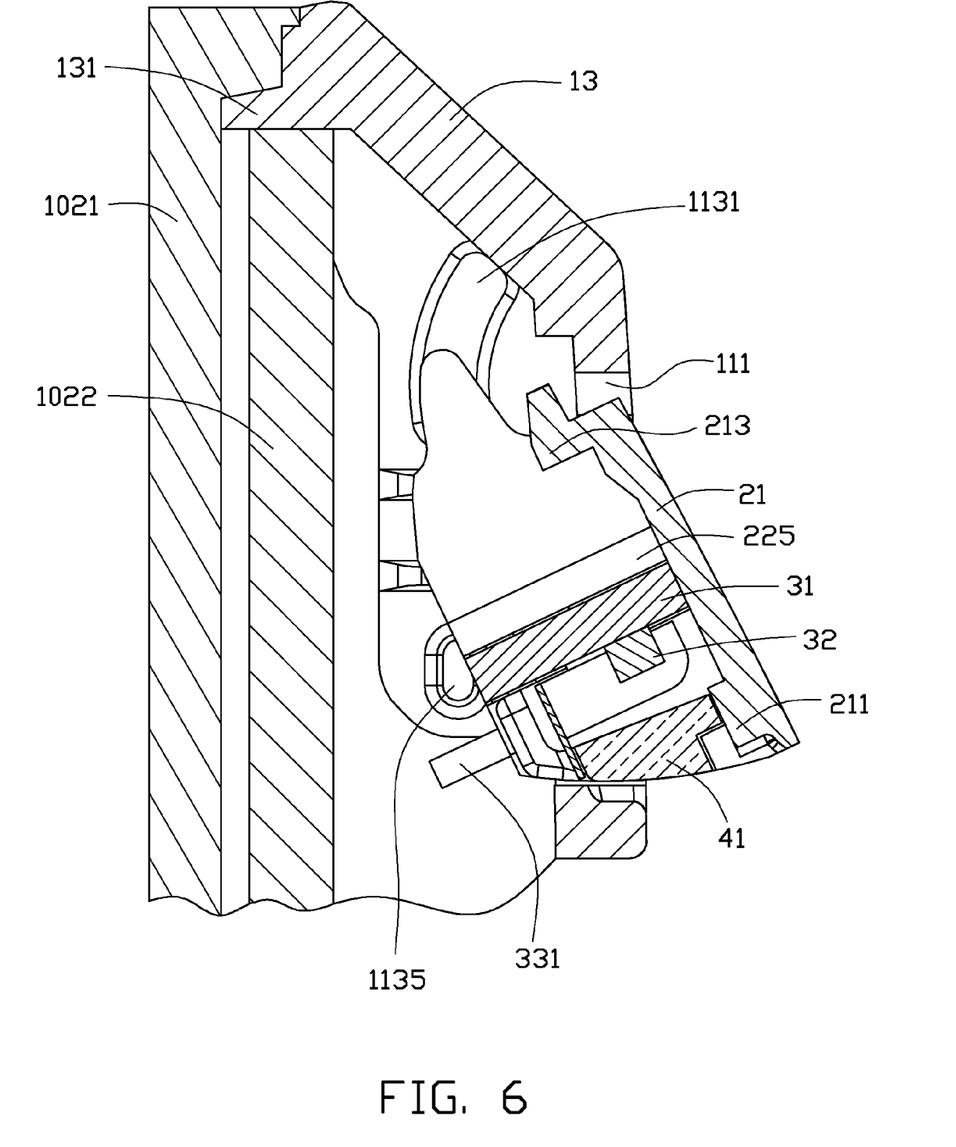
FIGS. 6 and 7 are cross-sectional views taken along the line VI-VI of FIG. 1, showing the electronic device in two using states respectively.
Figure 7:
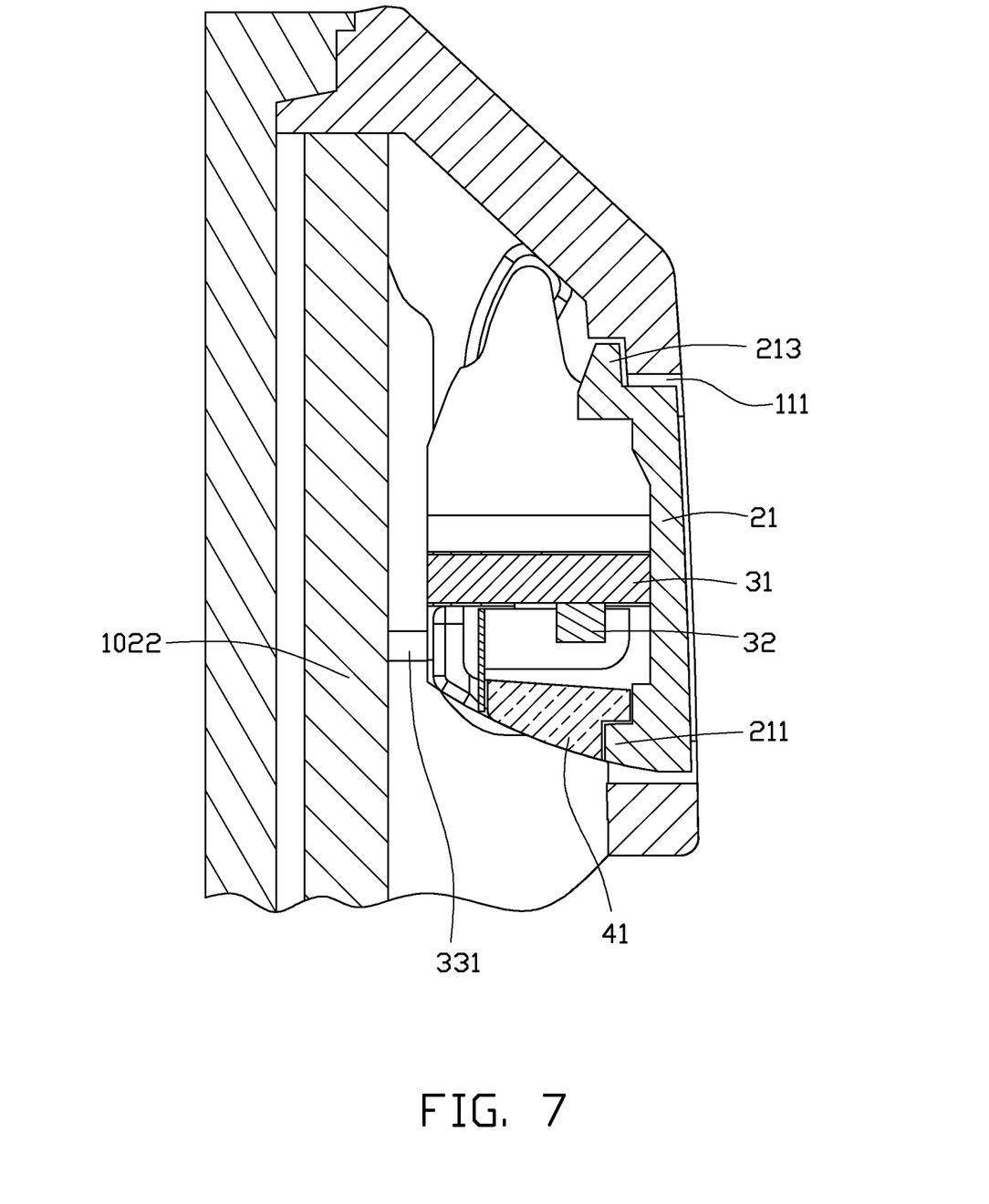

FIG. 6 and FIG. 7 show that the LCD monitor 102 includes a cover 1021 and a back plate 1022 located inside the cover 1021. The flange 131 is engaged between an inner side of the cover 1021 and a top portion of the back plate 1022. The circuit board 31 is electrically connected to the computer base 100. The switch 331 abuts against the back plate 1022 to turn off the lighting element 32.

When using the electronic device in the dark, the pivoting member 20 is rotated out by operating the light apparatus 200 in the recess 112 and the cutout 212. The tabs 431 are released from the second notches 1135 and respectively engaged in the first notches 1133. Thus, the guiding body 41 is extended out of the bracket 10. The switch 331 is disengaged from the back plate 1022 to turn on the lighting element 32. Therefore, the lighting element 32 shines and the lights of the lighting element 32 extend through the guiding body 41 to illuminate an operating area of the electronic device.

When not using the lighting apparatus 200, the base board 21 of the pivoting member 20 is pressed. The pivoting member 20 is pivoted to withdraw back into the bracket 10. The switch 331 abuts against the back plate 1022 to turn off the lighting element 32. The tabs 431 are released from the first notches 1133 and respectively engaged in the second notches 1135, to position the pivoting member 20 relative to the bracket 10.

In this embodiment, the tabs 431 are not only used for fixing the light guiding unit 40 to the pivoting member 20, but also for extending through the side boards 22 to engage into the first or second notches 1133 and 1135 to position the pivoting member 20. In other embodiments, the tabs 431 are formed on the outer surfaces of the side boards 22, to position the pivoting member 20. Other tabs may be formed on the clipping members 43 to fix the light guiding unit 40 to the pivoting member 20. The light guiding unit 40 may be fixed to the pivoting member 20 by adhesion.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A lighting apparatus, comprising:
a bracket comprising a main wall defining an opening, two mounting plates extending from the main wall and respectively located at opposite sides of the opening, each mounting plate defining a slide slot in a first side of the mounting plate, and a first notch and a second notch in an inner surface of a second side of the mounting plate;
a pivoting member movably attached to the bracket, wherein the pivoting member comprises a base board and two opposite side boards extending from opposite ends of the base board, a sliding block extends from a first end of an outer surface of each side board, a tab is attached to a second end of the outer surface of each side board; and
a lighting unit fixed in the pivoting member between the side boards;
a light guiding unit, wherein the light guiding unit is fixed in the pivoting member and abuts against the lighting unit;
wherein the light guiding unit comprises a transparent guiding body and two clipping members attached to opposite ends of the transparent guiding body, the tab extends from an outer surface of each clipping member, each side board defines a through hole through which the tab extends out of the side board;
wherein the sliding blocks of the pivoting member are slidably engaged in the corresponding slide slots of the bracket, when the lighting unit is to be used, the pivoting member is pivoted out of the bracket until the tabs engage in the corresponding first notches to expose the lighting unit; and when the lighting unit is to be folded into the bracket, the pivoting member is pivoted into the bracket until the tabs engage in the corresponding second notches to cover the lighting unit.

2. The lighting apparatus as claimed in claim 1, wherein the lighting unit comprises a circuit board fixed between the side boards, and a lighting element and a controlling element arranged on the circuit board, the controlling element comprises a switch, the pivoting member is pivoted into the bracket to make the switch turn off the lighting element, the pivoting member is pivoted out of the bracket to make the switch to turn on the lighting element.

3. The lighting apparatus as claimed in claim 2, wherein the lighting element is a light-emitting diode (LED).

4. The lighting apparatus as claimed in claim 2, wherein two arc-shaped raised portions extend up and out from opposite ends of the circuit board, a round cutout is defined in each end of the circuit board above the corresponding raised portion, a locking slot is defined in each side board, a guiding slope is formed on each side board above the locking slot, the lighting unit is pressed down between the side boards, until the raised portions are deformed to ride over the corresponding guiding slopes and restored to engage into the corresponding locking slots.

5. The lighting apparatus as claimed in claim 2, wherein the transparent guiding body and the clipping members are made of flexible material.

6. The lighting apparatus as claimed in claim 5, wherein each side board forms a blocking plate, the lighting unit is located among the blocking plates and the light guiding unit.

7. The lighting apparatus as claimed in claim 1, wherein two blocks extend outward from an inner surface of one side of the base board, the two blocks are blocked by a portion of an inner surface of the main wall adjacent to the opening.

8. An electronic device, comprising:
a base; and
a lighting apparatus mounted to the base, the lighting apparatus comprising:
a bracket mounted to the base, wherein the bracket comprises a main wall defining an opening, two mounting plates extending from the main wall and respectively located at opposite sides of the opening, each mounting plate defining a slide slot in a first side of the mounting plate, and a first notch and a second notch in a second side of the mounting plate;
a pivoting member movably attached to the bracket, wherein the pivoting member comprises a base board and two opposite side boards extending from opposite ends of the base board, a sliding block extends from a first end of an outer surface of each side board, a tab is attached to a second end of the outer surface of each side board; and a lighting unit fixed in the pivoting member between the side boards;

a light guiding unit, wherein the light guiding unit is fixed in the pivoting member and abuts against the lighting unit;

wherein the light guiding unit comprises a transparent guiding body and two clipping members attached to opposite ends of the transparent guiding body, the tab extends from an outer surface of each clipping member, each side board defines a through hole through which the tab extends;

wherein the sliding blocks of the pivoting member are slidably engaged in the corresponding slide slots of the bracket, the pivoting member is pivoted out of the bracket until the tabs engage in the corresponding first notches to expose and turn on the lighting unit; the pivoting member is pivoted into the bracket until the tabs engage in the corresponding second notches to cover and turn off the lighting unit.

9. The electronic device as claimed in claim 8, wherein the lighting unit comprises a circuit board fixed between the side boards, and a lighting element and a controlling element arranged on the circuit board, the controlling element comprises a switch, the base comprises a back plate, the pivoting member is pivoted into the bracket to make the switch abut against the back plate to turn off the lighting element, the pivoting member is pivoted out of the bracket to make the switch disengage from the back plate to turn on the lighting element.

10. The electronic device as claimed in claim 9, wherein the lighting element is a light-emitting diode (LED).

11. The electronic device as claimed in claim 9, wherein two arc-shaped raised portions extend up and out from opposite ends of the circuit board, a round cutout is defined in each end of the circuit board above the corresponding raised portion, a locking slot is defined in each side board, a guiding slope is formed on each side board above the locking slot, the lighting unit is pressed down between the side boards, until the raised portions are deformed to ride over the corresponding guiding slopes and restored to engage into the corresponding locking slots.

12. The electronic device as claimed in claim 9, wherein the transparent guiding body and the clipping members are made of flexible material.

13. The electronic device as claimed in claim 12, wherein each side board forms a blocking plate, the lighting unit is located among the blocking plates and the light guiding unit.

14. The electronic device as claimed in claim 8, wherein two blocks extend outward from an inner surface of one side of the base board, the two blocks are blocked by a portion of an inner surface of the main wall adjacent to the opening.

15. The electronic device as claimed in claim 8, wherein the base is a notebook computer and comprises a computer base and a liquid crystal display (LCD) monitor pivotably attached to the computer base, the lighting apparatus is mounted to a side of the LCD monitor opposite to the computer base, the LCD monitor comprises a cover, the back plate is located inside the cover, the bracket comprises a flange, the flange is engaged between an inner side of the cover and a top portion of the back plate.

16. An electronic device, comprising:

a base; and a lighting apparatus mounted to the base, the lighting apparatus comprising:

a bracket mounted to the base, wherein the bracket comprises a main wall defining an opening, two mounting plates extending from the main wall and respectively located at opposite sides of the opening, each mounting plate defining a slide slot in a first side of the mounting plate, and a first notch and a second notch in a second side of the mounting plate;

a pivoting member movably attached to the bracket, wherein the pivoting member comprises a base board and two opposite side boards extending from opposite ends of the base board, a sliding block extends from a first end of an outer surface of each side board, a tab is attached to a second end of the outer surface of each side board; and a lighting unit fixed in the pivoting member between the side boards;

a light guiding unit, wherein the light guiding unit is fixed in the pivoting member and abuts against the lighting unit;

wherein the light guiding unit comprises a transparent guiding body and two clipping members attached to opposite ends of the transparent guiding body, the tab extends from an outer surface of each clipping member, each side board defines a through hole through which the tab extends;

wherein the sliding blocks of the pivoting member are slidably engaged in the corresponding slide slots of the bracket, the pivoting member is pivoted out of the bracket until the tabs engage in the corresponding first notches to expose and turn on the lighting unit; the pivoting member is pivoted into the bracket until the tabs engage in the corresponding second notches to cover and turn off the lighting unit; and wherein the lighting unit comprises a circuit board fixed between the side boards, and a lighting element and a controlling element arranged on the circuit board, the controlling element comprises a switch, the base comprises a back plate, the pivoting member is pivoted into the bracket to make the switch abut against the back plate to turn off the lighting element, the pivoting member is pivoted out of the bracket to make the switch disengage from the back plate to turn on the lighting element.

\* \* \* \* \*